Oct. 24, 1950   J. D. F. SMITH   2,527,105
VERTICAL SPACE OR LINE COUNTER FOR TYPEWRITERS
Filed Feb. 13, 1948   4 Sheets-Sheet 1

Inventor
James D. F. Smith

By Clarence A. O'Brien
and Harvey B. Jacobson
Attorneys

Oct. 24, 1950   J. D. F. SMITH   2,527,105
VERTICAL SPACE OR LINE COUNTER FOR TYPEWRITERS
Filed Feb. 13, 1948   4 Sheets-Sheet 3

*Inventor*
James D. F. Smith
By Clarence A. O'Brien
and Harvey B. Jackson
*Attorneys*

Oct. 24, 1950  J. D. F. SMITH  2,527,105
VERTICAL SPACE OR LINE COUNTER FOR TYPEWRITERS
Filed Feb. 13, 1948  4 Sheets-Sheet 4

Inventor
James D. F. Smith
By Clarence A. O'Brien
and Harvey B. Jacobson
Attorneys Patented Oct. 24, 1950

2,527,105

UNITED STATES PATENT OFFICE 2,527,105

VERTICAL SPACE OR LINE COUNTER FOR TYPEWRITERS

James D. F. Smith, St. Paul, Minn.

Application February 13, 1948, Serial No. 8,215

14 Claims. (Cl. 197—189)

This invention comprises novel and useful improvements in a vertical space or line counter for typewriters and more specifically pertains to a means for indicating and registering the number of spaces or lines of typing which have been completed by means of a mechanism calibrated to the operation of the typewriter space or line lever.

The principal object of this invention is to provide a register and indicator which shall automatically display the number of lines or spaces for which the device shall have been adjusted to indicate and which shall produce an audible signal when the predetermined number of lines or spaces has been attained.

An important feature of the invention resides in the provision of a register or counter in conformity with the foregoing object which shall be compact, of light weight, have relatively few moving parts, be readily adjusted for operation and easily mounted upon various makes of typewriters, and which shall be dependable and accurate in its functioning.

A further important feature of the invention is the provision of an attachment in accordance with the foregoing objects and features which may be readily mounted upon the spacer lever of any standard make of typewriter for automatic actuation whenever said spacer lever is operated.

An additional important feature of the present invention is the provision of a mechanism in conformity with the foregoing objects and features which shall be operated by a hydraulic means; and which hydraulic means shall be completely sealed and enclosed in the mechanism.

Yet another feature of the invention resides in the provision of a novel indicating or signaling means which is automatically operable in response to the line-by-line actuation of the device, which may be readily reset as desired, and which may be readily adjusted to any predetermined number of spacing lines for automatically causing the resetting of the entire mechanism to its original position when the desired number of lines of typing has been obtained.

A further important feature of the invention resides in the provision of a novel construction whereby a predetermined fluid pressure is imposed on the confined hydraulic operating medium, and wherein operating impulses are imparted to an operating piston in response to each actuation of the spacer lever of the typewriter for producing an operating impulse in the hydraulic system to cause a step-by-step movement of a fluid pressure responsive piston for operating the indicating or signalling mechanism.

These, together with various ancillary objects and features of the invention which will subsequently appear as the specification proceeds, are attained by this device, a preferred embodiment of which has been illustrated, solely by way of example of the principles of the invention, in the accompanying drawings, wherein:

Figure 12 is a central longitudinal sectional view, parts being broken away, of a push-rod element of the invention;

Figure 13 is a perspective view of the interior or lower side of a removable cover forming a part of the casing of the device;

Figure 14 is a vertical transverse sectional view on a somewhat enlarged scale, showing the construction of the audible and visual signalling means and a portion of its operating mechanism;

Figure 15 is a side elevational detailed view of a part of the construction shown in Figure 14;

Figure 16 is a horizontal sectional view taken substantially upon the plane of the section line 16—16 of Figure 14; and, Figure 17 is a horizontal sectional view taken substantially upon the plane of the section line 17—17 of Figure 14.

Figure 1:
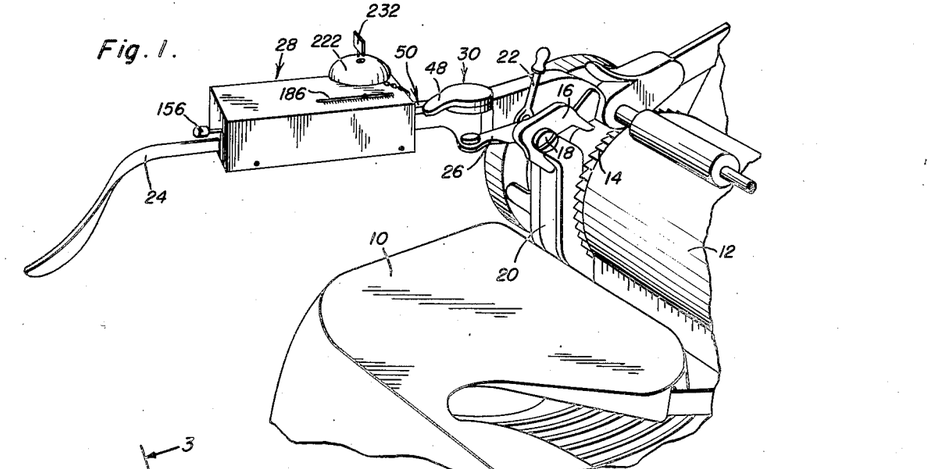
Figure 1 is a perspective view of a fragment of a conventional form of typewriter showing the invention mounted upon the spacer lever of a typewriter for operation thereby.

Referring now more specifically to the accompanying drawings, wherein like numerals designate similar parts throughout the various views, attention is directed first to Figure 1, wherein 10 designates a portion of the framework of a typewriter of known design which frame includes a typewriter carriage, not shown, upon which is suitably journalled for rotation thereon a platen 12 provided with a customary operating gear 14 in the form of a ratchet wheel, which is operated in a step-by-step motion, to advance the work one step at a time by means of a pawl 16 pivotally mounted as at 18 to a part of the carriage 20 which is movably and slidably mounted for movement transversely of the frame 10 in accordance with conventional practice. A manual adjusting means 22 is provided for regulating the operation of the pawl 16 on the ratchet 14, to thereby cause selectively single, double or triple spacing by appropriate movement of the platen 12 in response to a single actuation of the spacer lever 24, which spacer lever is pivoted to a portion of the carriage 20 and is connected by a link 26 with the pawl member 16 for actuation of the latter.

In accordance with this invention, the indicator or signalling attachment although not limited thereto in use, may be conveniently mounted upon and carried by the spacer lever 24. This attachment, indicated generally at 28, is attached to the spacer lever 24 at any suitable point thereon, but in juxtaposition to a stationary actuating cam indicated generally at 30 which is rigidly but removably and replaceably attached to any suitable portion of the frame of the carriage 20, as for example, at the pivot of the spaced lever 24.

Figure 3:
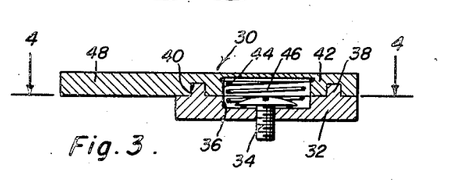
Figure 3 is an enlarged detailed view taken substantially upon the plane of the vertical section line 3—3 of Figure 2 and showing the interior construction of the actuator cam of the device.
Figure 4:
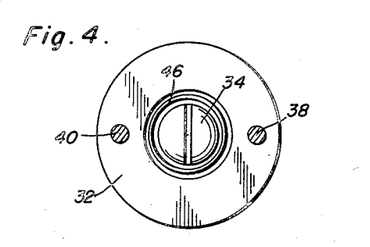
Figure 4 is a horizontal sectional view taken substantially upon the plane of the section line 4—4 of Figure 3.

As shown best in Figures 3 and 4, this stationary cam comprises a base plate 32 which is secured to the upper surface of the carriage 20 as by a fastening screw 34 which is received within a recess or chamber 36 in the upper surface of the plate 32, and extends through an aperture in the base thereof. Extending upwardly from the base plate 32 are a pair of dowel pins 38 which register with and are receivable in correspondingly positioned bores or recesses 40 in the undersurface of a cover plate 42 having a chamber 44 therein registering with the above mentioned chamber 36.

A tension spring 46 of the coil type is received within the two chambers 36 and 44, and has its extremities secured to the fastening screw 34, and in any suitable manner, to the upper plate 42, for yieldingly urging these parts together and retaining the two parts in assembled, non-rotatable, rigid and fixed position. In order to assemble or remove the device, it is merely necessary to pull the top plate 42 from its seat upon the dowel pins 38, against the tension of the spring 46, whereby access may be had to the screw 44 for installing or removing the base plate 32 from the carriage of the typewriter. Also, the cam plate 42 may be lifted from the dowel pins 38 and 40, rotated through 180° and re-seated on the pins thereby positioning the cam 48 in an inoperative position and disconnecting the attachment. Obviously, only a movement is thus required to engage or disengage the attachment.

Preferably integrally formed with the top plate 42 and extending laterally therefrom, is an extension 48 comprising a stationary operating cam, the peripheral edge of which extension is properly contoured to impart the desired movement to the end of an operating plunger 50 mounted in the recording device 28 and forming part of an operating mechanism to be now described. As will thus be seen, upon oscillation of the spacer lever 24, the device 28 and the plunger 50 carried thereby are oscillated with respect to the stationary cam 48, and this cam imparts a predetermined timed movement of predetermined amplitude to the plunger 50, as set forth hereinafter. Obviously, various alternative designs of cams could be substituted in order to vary the operations of the device and adapt it to different machines.

Attention is now directed chiefly to Figures 5, 6, 7 and 8 for a better understanding of the construction of the hydraulically actuated indicating mechanism.

The apparatus includes a body portion 52 of any suitable construction forming a casing for supporting and housing the various operating parts of the mechanism as set forth hereinafter, which casing is provided with three longitudinally extending parallel hydraulic cylinders of appropriate and suitable dimension comprising a reservoir cylinder 54 having a pressure maintaining piston 56 slidable therein, this piston being loaded by a spring 58 whose compression pressure exerted on the piston 56 is adjusted by a removable cylinder plug or cover plate 60. An operating cylinder 62 extends entirely through the casing 52, and at one end slidably receives the operating plunger 50, while the other end is provided with a closure plug 64 having non-return inlet and outlet ball check valves 66 and 68 therein respectively. The third or operated cylinder 70 slidably receives therein the operating piston 72 of the device which is urged outwardly of the cylinder by a compression spring 74, a fluid pressure chamber 76 being formed between the outer surface of the piston 72 and the inner surface of a cylinder closure plug or head 78.

Figures 5, 10:
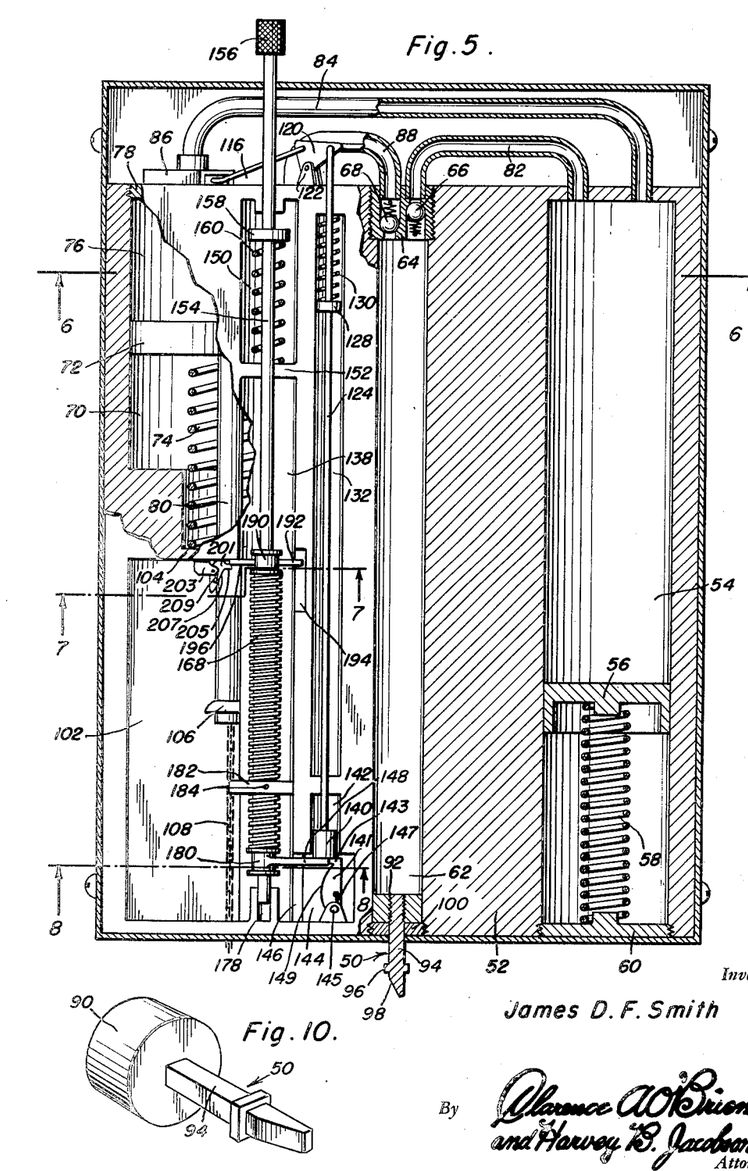
Figure 5 is a horizontal sectional view taken substantially upon the plane of the broken section line 5—5 of Figure 6, parts being broken away, to show the arrangement and construction of various internal parts of the device.
Figure 10 is a perspective view of the operating piston of the device.

Rigidly secured to the piston 72 on the opposite side from its pressure face is a piston rod 80 which is connected to mechanism to be subsequently described for responding to the strokes of the operating plunger 50, and after a predetermined number of operations of the piston 72 by the actuation of the platen, operates a signalling mechanism to be later set forth.

A supply conduit 82 has free communication with the delivery end of the reservoir cylinder 54, and communicates with the non-return inlet check valve 66 of the operating cylinder 62, thus maintaining the latter filled with operating fluid and under a predetermined minimum pressure for which the plunger 56 is adjusted. A return conduit 84 has free communication with the delivery end of the reservoir cylinder 54, while its other end communicates with the operating chamber 76 of the cylinder 70, under control of an automatically operated valve assembly, the housing of which is indicated by the numeral 86. After the cylinders 54, 62 and 76 are charged with hydraulic fluid, the same being filled in any suitable or desired manner, the pressure of the spring 58 is adjusted by the plug 60, to cause the piston 66 to impart any desired static pressure upon the fluid of the system. The fluid thus produced in the cylinder 54 is transmitted by means of the delivery conduit 82 and check valve 66 into the operating cylinder 62, which thereby has its minimum pressure equal to the pressure for which the reservoir 54 is set. By means of the outwardly opening check valve 68, and conduit 88 attached thereto, this same predetermined pressure is constantly maintained as the minimum pressure in the pressure operating chamber 76, since the open end of the conduit 88 continuously communicates therewith. Thus, a minimum pressure as determined by the adjustment of piston 56 is maintained in each of the chambers 54, 62 and 76.

As will thus be seen, there is no return flow from the operating cylinder 62 to the reservoir cylinder 54, but any fluid forced from the operating cylinder is delivered to the operated cylinder 76 by means of the conduit 88. Any replenishment necessary for the cylinder 62, as when the piston plunger 50 is retracted as set forth hereinafter, is obtained through the inwardly opening check valve 66 of the conduit 82. However, when the indicating device is reset, and the operating piston 72 is returned to its outer or idle position in the chamber 76 by the spring 74 in a manner to be set forth hereinafter, fluid is delivered through the control valve casing 86 and return conduit 84 back into the reservoir 54 to thus restore the initial volume of fluid in the reservoir while still maintaining the predetermined pressure therein.

Attention is now directed more particularly to the operating plunger and its cycle of operation. As shown in Figures 5 and 10, this plunger consists of a piston 90 which is slidable in the operating cylinder 62 and may have a fluid-tight sealing engagement therewith if desired, this piston screw-threadedly engaging as at 92, the end of the piston rod 94, which rod is provided with a rectangular shoulder or flange 96 constituting a stop means limiting inward movement; and at its outer extremity is provided with a cam surface 98 oscillatably engaging the stationary actuating cam 48 previously mentioned. The piston rod 94 is slidably guided and retained by the plug 100 which is threaded into one end of the operating cylinder 62.

As will readily be seen, the predetermined pressure of the system normally maintains the plunger 50 at the end of its outward stroke in the cylinder 62, although a supplemental spring means may be employed if desired. Upon each actuation of the spacer lever 24, however, the device 28 and the plunger carried thereby are oscillated relative to the stationary cam, whereby on each such movement the plunger is given an inward stroke in the cylinder 62, thereby displacing a predetermined quantity of fluid from said cylinder through its delivery conduit 88 past the check valve 68 into the operating chamber 76 of the piston 72. This result is effected since the check valve 66 prevents delivery of the fluid displaced by the piston 90 back into the reservoir cylinder 54. As soon as the plunger cam 98 disengages the actuator cam 48, by release of the spacer lever 24, the pressure within the cylinder 62 drives the plunger 90 back to its original position, while the piston 56 forces a displacement of fluid from the reservoir 54 into operating cylinder 62 to compensate for the quantity of fluid delivered by the plunger into the operating chamber 76.

As will be seen, on each such actuation of the plunger 50, a predetermined quantity of fluid is forced into the chamber 76, thereby causing a predetermined displacement of the piston 72 inwardly of said chamber. Obviously, the cross-sectional areas of the cylinders 62 and 76 may have any desired predetermined ratio, whereby the unit of volume of fluid displaced by the plunger piston 90 on each operating stroke will produce a calibrated and predetermined extent of travel of the piston 72 and of its piston rod 80.

Figure 7:
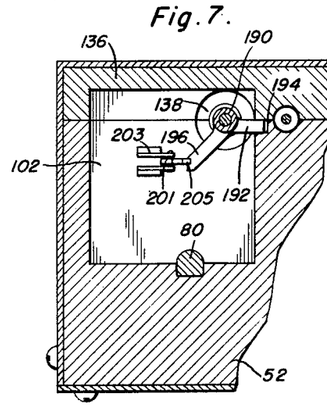
Figure 7 is a fragmentary vertical transverse sectional view taken substantially upon the plane of the section line 7—7 of Figure 5.

In substantial alignment with the cylinder 70, the casing 52 is provided with a chamber 102 which is separated from the cylinder 70 by the partition 104 and is provided with a fluid-tight sealing engagement of any suitable sort with the piston rod 80, this piston rod being of non-circular shape, as shown in Figure 7, to prevent rotation of the piston rod for a purpose which will later become apparent. Adjacent its lower end, the piston rod is provided with a lateral shoulder or lug 106 which constitutes an actuating means for the reset mechanism after a predetermined number of lines or spaces used on the platen roll. The end of the piston rod has secured thereto a chain or cable 108, which extends through the end walls of the block 52, and is connected with the audible and visual signalling means in a manner to be subsequently set forth. It should be noted, however, that this cable or chain is urged outwardly of the chamber 102 by spring means connected with the signalling means, whereby as the piston 72 is forced inwardly of the cylinder 70 against the opposition of its spring 74, the inward travel of the piston rod 80 permits the chain 108 to be withdrawn from the casing 102, thereby permitting movement of the signalling means as set forth hereinafter.

Figure 9:
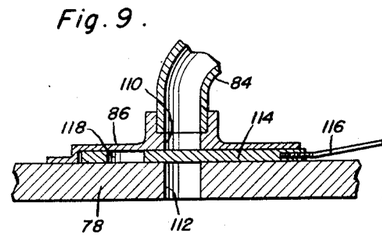
Figure 9 is a detailed view, somewhat enlarged, taken upon the plane of the horizontal section line 9—9 of Figure 6.

Attention is now directed to Figures 5 and 9 for a description of the valve controlling the return movement of the operated piston. The valve casing 86 secured to the closure plug 78 of the cylinder 70 is provided with a port or passage 110 which is in alignment with but spaced from a corresponding port or passage 112 in the plug 78. The conduit 84 communicates with the port 110 as shown in Figure 9. A slidable valve member in the form of a plate 114 and provided with an actuating rod 116, is formed with a port 118 which is normally disposed out of registry with the aligned ports 110 and 112, as shown in Figure 9, whereby egress of fluid from the chamber 72 is prevented. However, when the actuating rod 116 is operated, the valve may be moved to the right as viewed in Figure 9, whereby the valve port 118 registers with the ports 110 and 112, to thereby establish free communication between the operating chamber 76 and the reservoir 54 through the conduit 84. When this connection is established, the spring 74 which is the strongest spring incorporated in this device, is permitted to urge the piston 72 outwardly of the cylinder 70, and discharge fluid from the operating chamber 76 through the conduit 84 back into the reservoir 54 against the opposition of the spring pressed plunger 56. During this return movement of the piston 72, and piston rod 80, the chain 108 is drawn into the chamber 102 to thereby restore the signalling device to its original position and to wind its actuating spring as set forth hereinafter.

Figure 6:
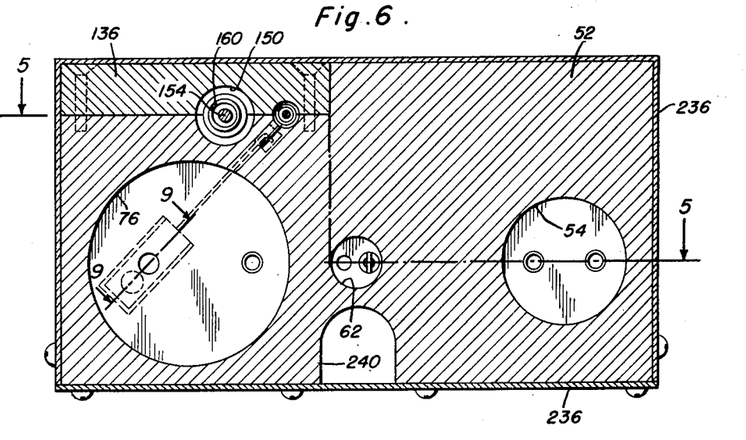
Figure 6 is a vertical transverse sectional view taken substantially upon the plane of the section line 6—6 of Figure 5.
Figure 8:
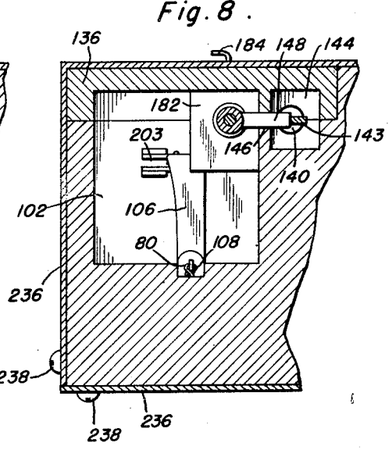
Figure 8 is a fragmentary vertical transverse sectional view taken substantially upon the plane of the section line 8—8 of Figure 5.
Figures 12, 13, 14, 15, 16, 17:
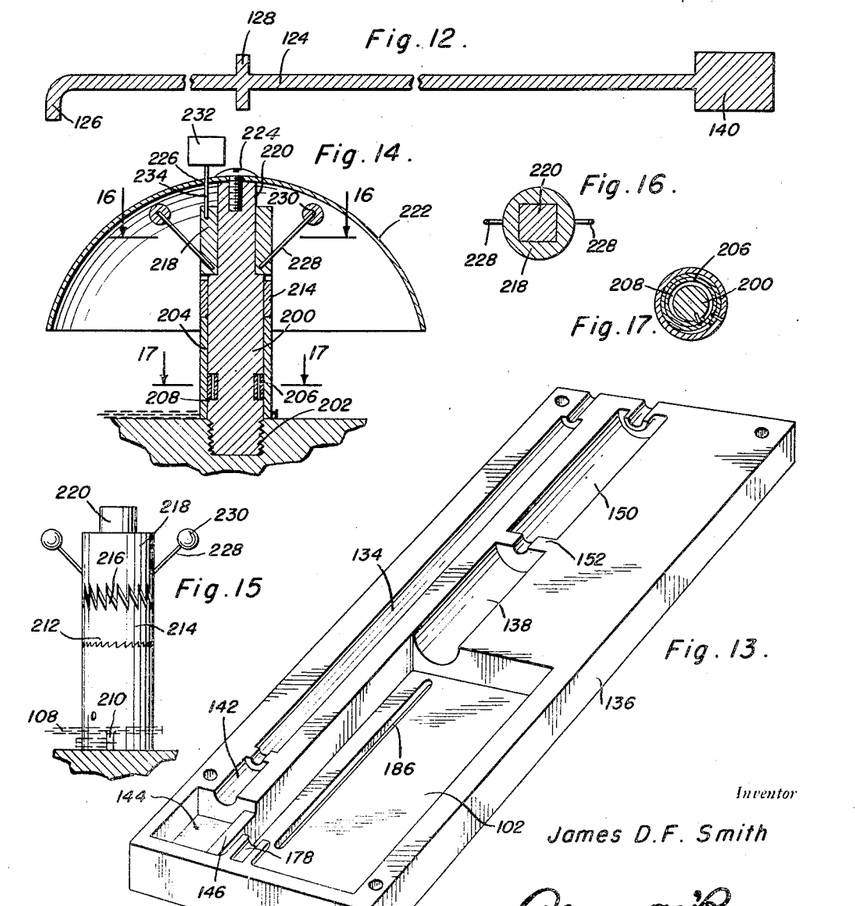

As will be seen from Figure 5, the end of the actuating rod 116 of the valve assembly is pivotally connected to one end of a bellcrank 120 which is pivotally mounted on a bracket 122 carried by any suitable portion of the body 52, and whose other end is pivotally connected to the valve actuating push rod 124. As shown in Figure 12, this latter member has its hooked end 126 pivotally connected to the bellcrank 120 for actuation thereof, and this push rod is provided with a shouldered portion 128 which is engaged by a spring 130, to urge the push rod in a direction to cause opening of the slide valve 114. The rod 124 is slidably received in a push rod chamber 132, and has its extremities journaled in the end walls of this chamber and in a complementary chamber 134, see Figure 13, formed in a detachable cover 136 which as shown in Figures 6, 7 and 8, is attached to the body 52 and overlies the chamber 102, the push rod chamber 132, and the reset rod chamber 138. The outer end of the push rod 124 is provided with a plunger 140 which is slidable in a guide chamber 142. The plunger 140 guided in the cylinder 142, extends into a compartment 144, see Figure 8, and a guide slot 146 communicates with the compartment 144 and the above mentioned chamber 102. An operating finger 148 extends in the guide slot 146 and is reciprocable therein as set forth hereinafter, and bears against the undersurface of the plunger 140, and opposes the opening movement of the rod 124 under the influence of the spring 130, to maintain the valve 114 in its closed position.

A latch 141, provided with a latch finger 143, is pivoted at 145 in the chamber 144 beneath the plunger 140. A spring 147 urges the latch into position by placing the finger 143 beneath plunger 140 to normally prevent actuation of the latter by the spring 130, thereby preventing opening of the valve member. The latch 141 has a cam surface 149 engageable by the finger 148 to selectively withdraw the latch finger 143 and permit spring 130 to open the valve member.

As will be more readily understood from an examination of Figures 5, 6, 7 and 8, the compartments 102, 144, 142 and 132 all register with complementary compartments formed in the cover plate 136 as shown in Figure 13.

Figure 11:
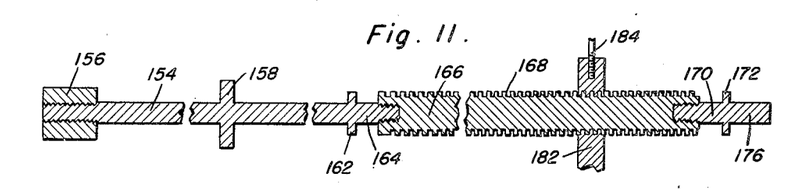
Figure 11 is a central longitudinal sectional view, parts being broken away, of the reset knob and shaft of the invention.

As shown more clearly in Figures 5 and 13, the previously mentioned channel 138 through which extends the valve release rod to be subsequently described, is divided from an aligned compartment 150 as by a partition member 152, the chamber 138 having free communication with the chamber 102. A release rod, see Figure 11, having a shank 154 with a knurled finger grip portion 156 screw-threaded upon the outer end thereof, is provided with an integral flange or collar 158 constituting an abutment for engagement by a spring 160 seated between said collar and the above mentioned partition 152, for urging the reset rod outwardly of the block 52. The shank 154 is journalled in bearings formed in the adjacent mating surfaces of the end walls of the compartment 150 in the body 52 and in the cover plate 136. The lower end of the shank 154 is provided with an integral flange or collar 162 and has its extremity 164 screw-threaded for detachable engagement with an externally screw-threaded rod 166 of substantially the same diameter as the flange or collar 162, the external threads of the member 166 being of a predetermined pitch and designated at 168 in Figures 5 and 11.

Screw-threaded into the free end of the member 166, is a pintle 170 having an integral flange or collar 172 of the same diameter as the flange 162, and having its outer extremity 176 rotatably and slidably received in a journal and guide bushing 178 formed in a boss on the inner wall of the chamber 102 in alignment with the bearings of the shaft 154 as above set forth. The above mentioned finger 148 is integrally carried by a sleeve 180 which is received upon the pintle 170 between the collar 172 and the end of the member 166, whereby the screw-threaded member 166 is freely rotatable within the sleeve 180 but causes the finger 148 to move longitudinally with the members 154 and 166. It will thus be seen that the spring 160 which is stronger than the spring 130, will urge the release rod into its outer position, causing the finger 148 to travel in the slot 146 and bearing against the plunger 140, cause the rod 124 to maintain the valve 114 closed against the opposition of its opening spring 130. However, when the release rod 154 is forced inwardly, as by the finger of the operator pressing on the finger grip portion 156, this rod and the screw member 166 may be urged inwardly against the opposition of spring 150, thereby withdrawing the finger 148 from the plunger 140, and permitting the spring 130 to operate the rod 124 and link 116 to open the valve, whereby the spring 74 may cause the piston 72 to be checked or force out operating fluid from within the operating chamber 76 back through the conduit 84 into the storage chamber 54, thereby driving the piston 56 downwardly against the opposition of its spring 58 to accommodate this inflow of fluid.

A travelling nut 182 is screw-threaded upon the threads 168, this nut being provided with an upwardly extending indicator pin 184, extending through the elongated guiding slot 186 formed in the cover plate 136, whereby this pin prevents rotation of the travelling nut, and describes a longitudinal movement in the slot 186 as the member 166 is rotated.

Figure 2:
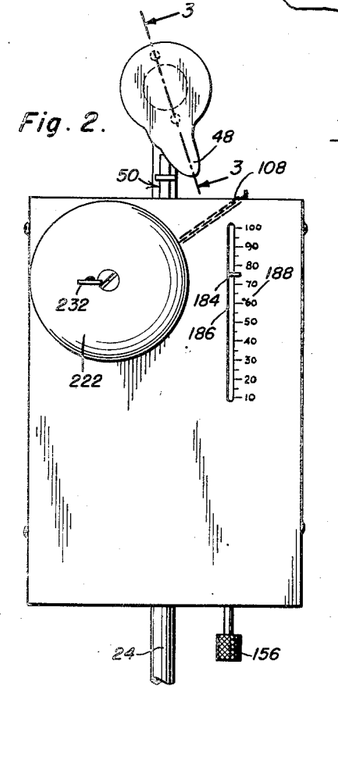
Figure 2 is a top plan view of the attachment shown mounted in Figure 1, upon a somewhat enlarged scale.

As shown in Figure 2, the upper surface of the cover plate 136 adjacent the slot 186 is provided with suitable indicia 188, whereby the longitudinal position of the indicating pin 184 in the slot 186, by means of appropriate synchronizing mechanism to be later set forth, may be manually set for operating the signalling mechanism after any desired number of lines of typing.

As so far described, it will thus be seen that the finger grip portion 156 may be rotated to cause adjustment of the travelling nut 182 and pointer 184 to the desired indicia 188 which corresponds to the number of lines which it is desired to type, and when so adjusted, each time the typewriter line spacer lever 24 is operated, the piston 72 will be driven a predetermined distance forwardly into its chamber 70, and the operating shoulder or lug 106 will be driven towards the travelling nut 182. When the desired number of lines have been typed or spaced, the shoulder 106 will engage the travelling nut 182, and the next operation of the piston 72 as effected by movement of the spacer lever 24, will cause the shoulder 106 to depress the travelling nut 182 together with the reset rod members 154 and 166 therewith. This depression, or reciprocation of the reset rod against the opposition of the spring 160, causes the disengagement of the finger 148 from the plunger 140 and release of the latch finger 143 by means of the engagement of the cam surface 149 by the finger 148 as set forth hereinbefore, whereby as will readily be seen, upon predetermined movement of the piston 72, as determined by the manual setting of the travelling nut by the reset rod, the release valve will be operated, the chamber 76 vented to the storage reservoir 54, the piston 72 returned to its original position and all of the parts properly positioned for beginning of a new cycle of counting, which will be concurrent with the placing of a new sheet of paper in the typewriter.

As will be further understood, concurrently with the foregoing operation, the chain 108 carried by the piston rod 80 will likewise be gradually released, until at the movement of disengagement of the finger 148 from the plunger 140, or if desired, just prior thereto, enough slack will be given the chain 108 to permit the functioning of the signalling device to be described hereinafter.

As shown in Figures 5 and 7, a sleeve or collar 190 is loosely received between the collar or flange 162 and the end of the member 166 upon the end portion 164 of the release rod 154, for longitudinal movement therewith. Integrally carried by this collar is a laterally extending arm or key 192 which is longitudinally slidable in an elongated slot 194 formed in the body member and communicating with the chamber 138 and chamber 102. This key sliding in its guideway prevents rotation of the collar and of a further integral arm 196 carried thereby and extending angularly thereto.

A detent 201 is pivoted to a bracket 203 in the chamber 102, see Figures 5 and 7, and has a latch finger 205 which is located in the path of travel of the arm 196 and is engageable thereby. This detent has an actuating or cam surface 207 which is selectively engageable by the lug 106. A spring 209 urges the detent into its locking position, shown in Figure 5.

The operation of this mechanism is as follows. As the piston 72 is driven outwardly by the repeated actuation of the plunger 90, the lug 106 approaches the travelling nut 182 which has been previously positioned manually as set forth hereinbefore. During this period, the spring 160 holds the rod 154 inwardly and the finger 148 is therefore holding plunger 140 and rod 124 inwardly to prevent opening of the valve. The spring pressed latch 141 is likewise in position to prevent outward movement of plunger 140 and of the valve rod 124.

When lug 106 engages travelling nut 182, further movement of piston 72 moves nut 182, rod 154 and finger 148 outwardly, eventually actuating cam surface 149 and causing latch finger 143 to release plunger 140 whereupon spring 130 causes a quick actuation of rod 124 and opening of the release valve. This movement of rod 154 by lug 106 also causes movement of arm 196 past the detent finger 205, the detent pivoting to permit this movement.

With the release valve open, the pressure in cylinder 76 is at once released back to the reservoir 54 and since the spring 74 is the strongest spring of the device, its pressure returns piston 72 to its inner or original position forcing the fluid from cylinder 76 back to reservoir 54.

However, during this return movement of the piston and the lug 106, the return of rod 154 is temporarily prevented by the engagement of the arm 196 on the outer or lower surface of the detent finger 205, thereby preventing disengagement of finger 148 from the latch cam 149. Since the rod 154 cannot return the release valve remains open since the spring 130 is unopposed in its operation.

When the piston 72 has substantially completed its return stroke, the lug 106 engages cam surface 207 of the detent, and pivots the latter clockwise against the spring 209 to disengage detent finger 205 from the arm 196. The spring 160 is now free to act and at once returns rod 154 to its initial or normal position. This movement causes finger 148 to be retracted from the cam 149 of latch 141 and to engage and lift plunger 140. Since the spring 160 is stronger than spring 130, the former causes inward movement of rod 124 thereby closing the release valve. The latch 141 is then again positioned beneath plunger 140 by the spring 147.

It will thus be seen that the device automatically holds the release valve open until the piston 72 has finished its return stroke before the release valve is permitted to close.

Attention is now directed more particularly to Figures 14, 15, 16 and 17, for a better understanding of the signalling mechanism. Suitably mounted upon the upper surface of the body 52 is a standard 200 whose lower end is screwthreaded externally as at 202 for attaching the standard to the body. A tubular sleeve 204 surrounds the lower end of the standard and a spiral flat coil spring 206 is seated in an annular groove or channel 208 in the member 200, and has its extremities attached to the standard 200 and to the sleeve 204 as indicated best in Figure 17, for resiliently urging the sleeve to rotate in one direction about the standard as set forth hereinafter.

The outer surface of the sleeve 204 adjacent the lower end thereof is provided with an outwardly extending lug 210, which is engaged by one end of the chain or cable 108 above mentioned, this chain being wound around the sleeve 204 and serving as a means, when unwound, to rotate the sleeve 204 against the opposition of the spring 206, to thereby tension the latter. It will thus be seen that the inward or outward movement of the piston 72 in the chambers 70 and 76 is reflected by a rotational movement of the sleeve 204 upon the standard 200.

The upper edge of the sleeve 204 is provided with clutch teeth 212, which establish a one-way driving connection with a second sleeve 214 likewise mounted upon the standard 200. The upper edge of the sleeve 214 is provided with a plurality of cam teeth 216 having about a forty-five degree incline with respect to the vertical axis of the sleeves and shaft, these teeth registering with correspondingly shaped teeth depending from a collar or sleeve 218 which is freely and rotatably journalled upon the upper portion of the member 200, which is reduced in diameter as at 220.

This reduced portion 220 is of square cross-section, as shown more clearly in Figure 16, whereby the sleeve 218 is prevented from rotating thereon but is free to reciprocate vertically thereof as set forth hereinafter. Where the reduced portion 220 joins the body portion of the member 200, there is provided a shoulder which constitutes a seat for normally receiving and supporting the sleeve 218.

A bell 222 constituting the signalling device, is secured to the upper reduced portion 220 as by a fastening bolt 224, this bell being provided with an aperture 226 for a purpose to be later set forth.

A plurality of semi-resilient arms 228 extend upwardly and outwardly from the sleeve 218, and are provided with balls or other weighted bell-clappers on the outer extremities thereof. These clappers 230 are so positioned as to be spaced slightly below the inner concave surface of the bell 222 when the sleeve is in its lower position, and resting upon the above mentioned shoulder, the parts being in the position shown in Figure 15. As slack occurs in the chain 108, the spring 206, permitted to rotate the lower sleeve upon the standard 200, and by means of the clutch 212, the intermediate sleeve 214 is rotated therewith. As will be noted, the clutch 212 is so arranged that when the chain 108 is tensioned, causing the sleeve 204 to tighten the spring 206, corresponding movement is not imparted to the sleeve 214, since the clutch teeth 212 are so inclined as to cause slippage in this direction of rotation of the driving sleeve 204. When the sleeve 214 is rotated in its unitary direction of rotation by the sleeve 204, the cam teeth 216 cause an upward reciprocation of the sleeve or collar 218, which is non-rotatably mounted upon the reduced portion 220 of the standard 200. This upward movement of collar 218, causes the clappers 230 to momentarily strike the bell 222 to provide an audible signal. At the same time, a signal flag 232 carried by a rod 234 extending through the aperture 226 and mounted upon the collar 218, is likewise elevated to produce a visual signal, thus informing the operator or typist that the desired number of lines for which the device has been set, has now been reached, without thereby requiring the operator to direct his attention constantly to the sheet of paper to determine when the desired margins have been attained.

Concurrently with the ringing of the bell and the raising of the signal, or slightly thereafter, as found to be preferable, the operating lug 106 contacts the carrier nut 182, depresses the reset mechanism, and permits the opening of the valve 114, thereby releasing the pressure in the operating chamber 76 and permitting the escape of fluid therefrom into the storage reservoir 54, whereupon the piston 72 assumes its initial position ready for the next operation of the device. From the foregoing, it will be seen that the device is entirely automatic in its operation in carrying out its cycle from start to finish and in resetting itself at the end of its cycle. Further, when it is manually desired to reset the device, as when removing a sheet of paper only partially completed or discarded, the reset rod may be manually depressed, instantly restoring the parts to their original position. Also, as will be readily seen, the entire hydraulic system of the device is completely self-enclosed, thereby minimizing any possibility of leakage, and minimizing the necessity for servicing the device. As will be readily seen, by selecting the proper shape of cam 48, the device may be adapted to any type of typewriter or other instrument in which it is desired to line space the work.

To further improve the appearance of the device, and to prevent accidental damage of any of its exposed parts or conduits, the entire mechanism is enclosed by end, side, bottom and top cover plates 236, attached thereto as by screws 238, except for the above described signalling mechanism. Thus, as shown clearly in Figure 5, the three conduits connecting the three cylinders of the device are protectively enclosed, and the channel member 240 formed on the lower surface of the body 52 and running longitudinally thereof as shown in Figure 6, which embraces and receives the space lever 24, is likewise enclosed, this plate serving to retain the device upon the spacer lever.

From the foregoing, it will be readily understood that the principles of the invention are equally applicable for attachment to other operating parts of a typewriter or other business machine, since it is merely necessary to utilize some element of the machine which is operated each time a new space or line is made upon the paper. Thus, the device could be mounted upon the carriage of the typewriter with the operating cam being positioned upon the spacer lever.

Should any leakage of liquid occur, or lost motion develop in the parts of the device, it is merely necessary to properly adjust the plug 60, to again impart the desired pressure to the fluid in the reservoir 54, and throughout the entire hydraulic system of the device. It will be apparent that any desired ratio of piston travel in the chamber 62 to piston travel in the chamber 76 may be given, and these relative movements will be calibrated with the pitch of the screw threads 168, whereby when the desired number of lines for which the device has been set are attained, the piston 72 will have positioned its lug 106 in position to operate the travelling nut 182 and thereby reset the mechanism after sounding the signal and raising the indicator flag thereof.

From the foregoing, it is believed that the manner of construction and the operation of the device will be readily understood together with the advantages arising therefrom, and accordingly further explanation is believed to be unnecessary.

However, since numerous modifications within the spirit of the invention will readily occur to those skilled in the art after a consideration of the foregoing description and accompanying drawings, it is not intended to limit the invention to the exact construction shown and described, but numerous modifications and equivalents may be resorted to falling within the scope of the appended claims.

Having described this invention, what is claimed as new is:

1. In a typewriter having a frame and a line spacer lever movable relative thereto, a signaling device comprising a body having signalling means and actuator means for said signalling means, a cam for operating said actuator means, said cam and body being mounted oppositely on said frame and line spacer lever for effecting operation of said actuator means in response to each actuation of the typewriter line spacer lever, said actuator means including a fluid pressure system having a fluid pressure chamber with operated and operating pistons therein, said pistons being operatively connected to said signalling means and said cam respectively.

2. The combination of claim 1 wherein said fluid pressure chamber has a check valve therein between said pistons for preventing return flow to said operating piston, and a bypass for effecting return flow of fluid from said operated to said operating pistons.

3. The combination of claim 2 wherein said bypass is provided with a control valve, and automatic operating means for said control valve connected with said operated piston for manipulating said control valve when said operated piston attains a predetermined position.

4. The combination of claim 3 including a manually operable means connected with said control valve for selective opening of said bypass.

5. The combination of claim 1 including a fluid pressure reservoir, a spring loaded piston for maintaining a predetermined minimum pressure in said reservoir, a passage connecting said reservoir to said chamber, and a bypass for effecting return flow from said operated to said operating piston, said bypass connecting with said reservoir.

6. The combination of claim 1 wherein said fluid pressure chamber has a check valve therein between said pistons for preventing return flow to said operating piston, and a bypass for effecting return flow of fluid from said operated to said operating pistons, said bypass having a control valve, a push rod operatively connected to said control valve, and means connected to said push rod and operable by said operated piston after a predetermined movement for opening said control valve.

7. The combination of claim 6 wherein said means includes a release rod, a member carried by said release rod and adjustable longitudinally thereof, said member being engageable by said operated piston, said release rod being reciprocable by said operated piston after said member has been engaged thereby, said rod having an element operatively engaging said push rod.

8. The combination of claim 7 wherein said push rod is resiliently urged to valve opening position, said release rod element opposing the valve opening movement of said push rod.

9. The combination of claim 8 wherein said release rod is provided with a spring, said spring yieldingly maintaining said element and push rod in valve closing position.

10. The combination of claim 9 including manual means for reciprocating said release rod to disengage said element from said push rod and permit said resiliently urged push rod to open said valve.

11. In a typewriter having a frame and a line spacer lever movable relative thereto, a signaling device comprising a body having signaling means and actuator means for said signaling means, a cam for operating said actuator means, said cam and body being mounted oppositely on said frame and line spacer lever, for effecting operation of said actuator means in response to each actuation of the typewriter line spacer lever, said signaling means including a standard, a sleeve rotatable upon said standard, a connecting linkage from said actuator means to rotate said sleeve in response to movement of said actuator means beyond a predetermined position, and means for producing a signal upon rotation of said sleeve.

12. The combination of claim 11 including a spring connected to said standard and urging said sleeve to its idle position.

13. The combination of claim 12 including a clutch member rotatable and reciprocable in said standard and connected to said last means, said clutch member having a one-way driving connection with said sleeve.

14. The combination of claim 13 including a reciprocable, non-rotatable collar on said standard, and cooperating cam surfaces on said collar and clutch member.

JAMES D. F. SMITH.

REFERENCES CITED

The following references are of record in the file of this patent:

UNITED STATES PATENTS

| Number | Name | Date |
|---|---|---|
| 1,106,424 | Strong | Aug. 11, 1914 |
| 1,170,988 | Nibourel | Feb. 8, 1916 |

FOREIGN PATENTS

| Number | Country | Date |
|---|---|---|
| 612,167 | Germany | Apr. 15, 1935 |